Patented Aug. 31, 1926.

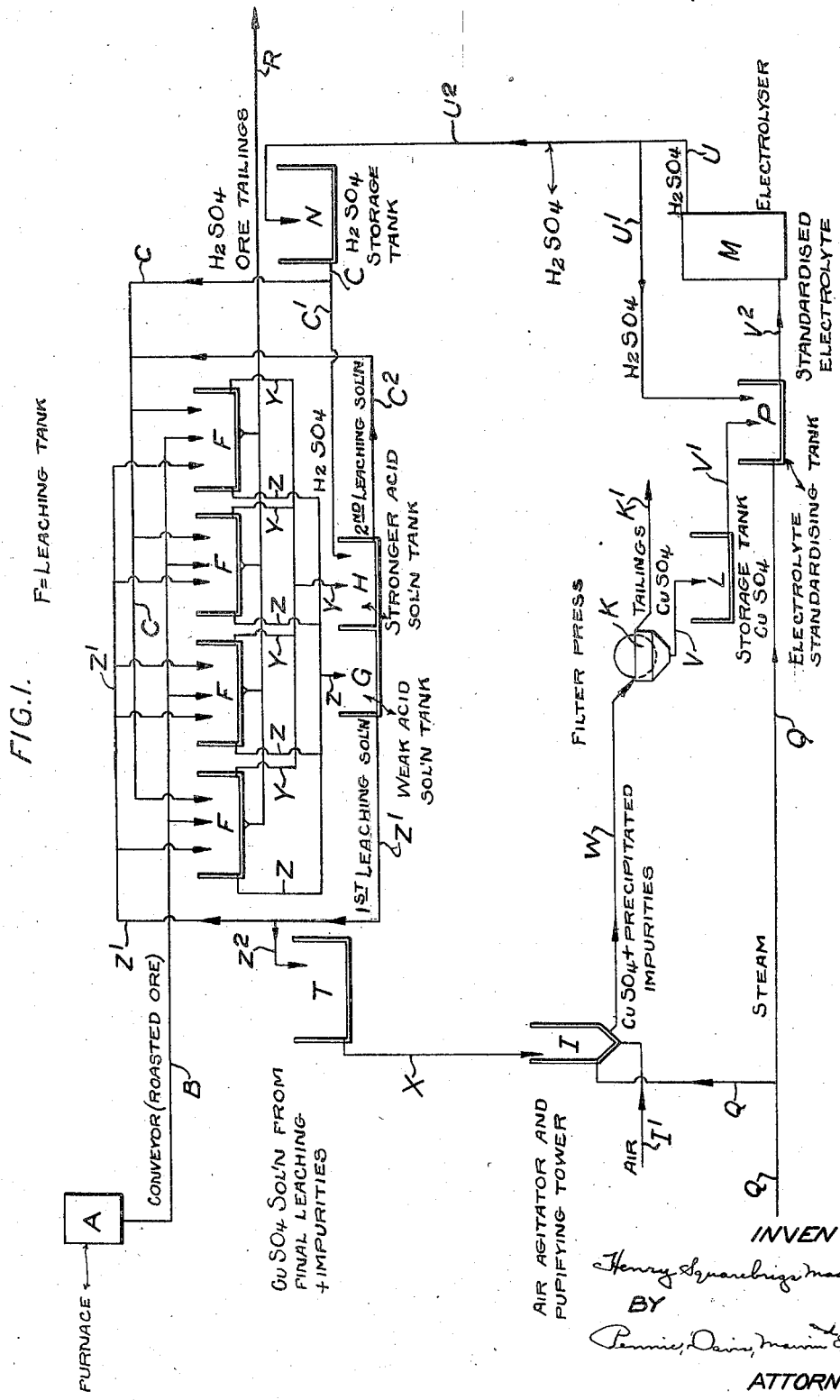

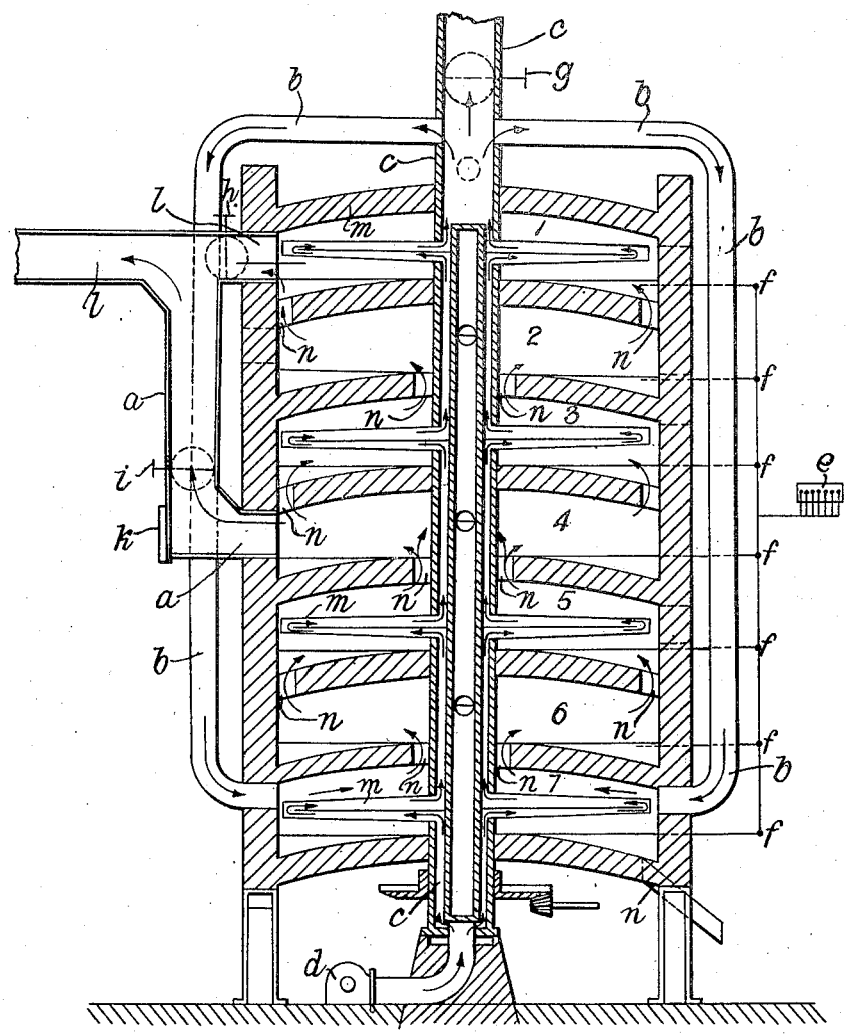

1,598,296

UNITED STATES PATENT OFFICE.

HENRY SQUAREBRIGS MacKAY, OF LONDON, ENGLAND.

ELECTROCHEMICAL TREATMENT OF COPPER ORES.

Application filed May 19, 1925, Serial No. 31,363, and in Great Britain May 29, 1924.

This invention refers to improvements in or relating to the electro-chemical treatment of copper ores. A primary object of the invention is to provide a complete electro-chemical process for the production of electrolytic copper from ores concentrates or residues of ores, particularly those containing iron and other base metals, which under normal conditions of roasting and leaching foul the solutions and prevent economical deposition of refined electrolytic copper directly from such solutions.

In order to overcome this difficulty it has previously been proposed in the specification of my United States Patent No. 1094371 and also my United States application for patent filed 23rd April 1923, Serial No. 634124, to roast the ore in such a manner that the copper is rendered soluble and the undesired metals insoluble so that in the subsequent leaching operation the soluble salts of copper are dissolved to the practical exclusion of the other metals.

The present invention on the other hand contemplates the purification of solutions carrying iron and other undesired constituents which have gone into solution with the copper during leaching. A further object is an accurate regulation and control of the acids and bases in the solution in such a manner that the process may be carried on indefinitely without the circulating solutions becoming excessive or deficient in acid strength.

In its application to copper sulphide ores my present invention comprises a complete process for directly producing electrolytic copper from such ores or concentrates or residues of such ores, comprising roasting the ores concentrates or residues to render the copper soluble, leaching the roasted product with a solution of sulphuric acid to extract the copper, purifying this copper sulphate solution of undesired constituents such for instance as iron and aluminium, regulating and controlling the acid and bases in the solution so as to maintain an electrolyte and a solvent of high efficiency and then electrolyzing such purified and regulated solution to deposit metallic copper and regenerate sulphuric acid.

Certain steps of my complete process have been proposed heretofore and no claim is made herein to any such known steps per se. In the purifying and regulating stage of my process not only are the undesired metals precipitated from the solutions before electrolysis but any acid combined in the solutions in excess of what is required in the process is neutralized and regulated so as to maintain at all times an efficient electrolyte and solvent. In cases where the solutions do not carry excess acid the purification is so regulated and controlled that it is effected without loss of acid.

This precipitation of undesired metals and neutralizing of excess acid is effected according to my present invention by treating the solution with an oxidizing agent and calcium carbonate in quantities just sufficient to precipitate the whole or a desired proportion of the base metals and only small amounts of copper and to neutralize as much as is desired of the combined acid in the solution.

A feature of my present invention comprises the calculation of the correct amount of calcium carbonate to be added to the solution to rid it sufficiently of the undesired metals iron and aluminium. This is done by computing the amounts by weight of iron and aluminium respectively which it is desired to precipitate from the solution, then multiplying the amount by weight of iron by the factor 1.786 and the amount by weight of aluminium by the factor 2.942. The sum of the figures obtained gives the quantity by weight of calcium carbonate to be added to the solution to precipitate the necessary quantities of iron and aluminium.

In this manner only a small amount of copper is precipitated and this is immediately recovered by adding to the solution and precipitates sufficient acid to re-dissolve the copper, leaving the iron and aluminium as insoluble precipitate.

In treating other classes of ore in which the solution drawn from leaching does not contain combined acid in excess of what is required in the process, the undesired metals such as iron and aluminium are precipitated before electrolysis by adding to the solution copper oxide or carbonate ore or copper hydroxide preferably with an oxidizing agent such as air. The iron and aluminium are thrown down as hydrates and the acid previously combined with the iron and aluminium is recovered in the solution combined with the added copper.

A further feature of the present invention comprises the use of two solutions of sulphuric acid of different concentration for leaching purposes, the weaker solution being used to leach the ore, preferably a fresh charge of ore, until a neutral solution is obtained enriched with metal from the ore and of relatively high specific gravity.

When this neutral solution has been withdrawn from the ore the stronger acid solution is applied to the previously leached ore to extract the remaining soluble metals. This charge of ore, exhausted of its desirable constituents is then discharged and a fresh charge brought into the leaching tanks. The last-named acid solution i. e. that one which was used for the second leaching of the previous charge, being now weaker in acid strength is used for the first leaching of the fresh charge which leaching is continued until this solution becomes neutral whereupon it is withdrawn from the ore and passed on to the next step in the process, i. e. purification as aforesaid.

Where the ore to be treated by my improved process contains copper in a form not soluble in a solution of sulphuric acid the ore must first be roasted. This applies to sulphide ores, pyritic ores and residues or concentrates from pyritic ores and semi-oxidized ores.

In such cases my present invention includes an improved method of roasting to convert the copper to soluble form. This roasting may be carried out in any suitable furnace, for example in a single hearth furnace of the known type or in the standard 7-hearth rotary-rabble furnaces such as are now in use.

I have found however that by making certain modifications in such standard multiple hearth furnaces greatly improved results can be obtained, and as a primary step in the treatment of ores concentrates or residues such as those above-mentioned in which the copper is not in soluble form, the method of roasting according to this invention comprises supplying hot air or heat in any form to the lower zone of the furnace, for instance to the 7th or lowermost hearth, and leading off the whole or any desired part of the gases formed in the lower hearths, for instance the 4th, 5th, 6th and 7th hearths, so that these gases are not allowed to pass through the remaining upper hearths as heretofore usual.

Thus a higher temperature is maintained in the lower zone of the furnace relative to that in the upper zone and a lower temperature in the upper zone relative to that in the lower zone with the result that a greatly improved oxidizing atmosphere is maintained throughout the furnace, and therefore through the roast. The hot air for supply to the lower zone of the furnace may be drawn from the air cooling system of the furnace.

In roasting ore containing a high percentage of sulphur no fuel is added. The temperature is controlled by the burning sulphur, the amount of air admitted to the furnace and the control of the gases produced.

The temperature centigrade which I use in roasting the ordinary cupriferous ores or concentrates in standard multiple seven-hearth furnaces, such as the wedge or Macdougal type with the modifications above described is about as follows:—

| | |
|---|---|
| 1st hearth | 350° C. |
| 2nd hearth | 400° C. |
| 3rd hearth | 475° C. |
| 4th hearth | 500° C. |
| 5th hearth | 575° C. |
| 6th hearth | 550° C. |
| 7th hearth | 350° C. |

These temperatures vary in treating different classes of ore.

Roasting cupriferous ores or concentrates with the furnace controlled as above specified decomposes the pyritic and other sulphides and expels the sulphur as $SO_2$ gas, which can be used in the ordinary manner to manufacture sulphuric acid. It also converts a large percentage of the copper in the ore to $CuSO_4$ and $CuO$, leaving from 0.08% to 0.20% of copper in the form of $CuS$. These percentages vary in different ores treated.

This furnace control also permits a small percentage of the iron in the ore to form $FeSO_4$ and aluminium in the ore to form $Al_2(SO_4)_3$.

When this roasted product is leached with sulphuric acid, copper and part of the iron and aluminium go into solution as sulphates of these metals. In solutions produced from leaching roasted cupriferous pyritic ore or concentrates, where the roasting is controlled as above specified, there is usually an excess of combined acid in the sulphates in the solution, and if electrolyzed without first neutralizing part of this combined acid, an excess of free acid over what is required in the process will be produced by electrolysis.

Furthermore the ferrous sulphate in such solution, unless removed to a very low percentage before electrolysis, will seriously interfere with the economical precipitation of pure electrolytic copper from copper sulphate solutions.

As aforesaid, provision is made according to the present invention whereby all solutions whether neutral as aforesaid or containing free acid are purified before they are electrolyzed to produce refined copper. Provision is also made to neutralize the excess acid and also to recover the free acid from sulphates of base metals in the solution if required in the process in treating certain classes of copper ore, like oxides or carbonates, where the combined acid in the sulphates in the solution is not in excess of what is required in the process.

In the accompanying drawings:—

Fig. 1 is a flow sheet showing in detail one method of operating my invention, but other methods may be employed by metallurgists skilled in the art, without departing from the scope of my invention.

Fig. 2 is a central vertical sectional view of an ordinary standard air-cooled roasting furnace but showing the modifications of my present invention.

Referring to Fig. 1.

The roasted ore from the furnace A is received on a cooling conveyor B and is delivered into the leaching tanks F, where the ore is leached with a solution of sulphuric acid delivered through line C. When the free acid in these solutions is reduced to a small percentage in leaching the ore they are drawn off from the bottom of the leaching tanks F through lines Z to the sump tank G. When the solutions drawn from the bottom of the leaching tanks F contain a higher percentage of free acid, lines Z are closed and these acid solutions are drawn off through lines Y to sump tank H.

The solution containing a small percentage of free acid drawn off into tank G is used as a first leaching solution and circulates through lines $Z^1$, and the ore in tanks F preferably until it becomes neutral and enriched with copper and other metal sulphates; it is then drawn off into tank T through line $Z^2$.

The object of this is to produce a metal-enriched and preferably neutral solution of high specific gravity so that it can be purified to produce and maintain an active leaching solution of low specific gravity in the most efficient and economical manner.

The acid solution drawn off into tank H is brought up to the required free acid strength from acid solution in tank N and this solution is applied through lines $C^2$ and C as a second leaching solution, of low specific gravity, to remove the remaining soluble metal in the ore.

This method of successively leaching the ore with two sulphuric acid solutions of different concentration is an important feature of my invention. By this method the metals and impurities accumulate in the first solution which may be made neutral as aforesaid, and this neutral solution can be purified much more effectively and economically than an acid solution, thus preventing the accumulation of an excess of base metals in the leaching solutions.

In treating copper ores according to my present invention, this solution carrying copper and base metals such as iron and aluminium is drawn off from tank T through line X into the agitator I where it is heated and agitated with air delivered through line $I^1$. If the acid combined with the sulphates in the solution is more than is required in the process, I add calcium carbonate ($CaCO_3$), in the form of powdered chalk or limestone, to the solution, in such a manner and under such conditions that the base metals like iron and aluminium will be precipitated without appreciable precipitation of copper. If, however, small quantities of copper are precipitated and are worth recovering I may subsequently add acid to take such copper again into solution.

It has heretofore been generally considered impossible to add calcium carbonate to a solution containing copper, iron and aluminium, without precipitating or partly precipitating all of these metals.

According to this part of my invention I determine the amount of calcium carbonate to be added to a solution containing iron, aluminium and copper, to precipitate iron and aluminium without precipitating copper. The formula and factors used are as follows:—

First determine by calculation the total weight, e. g. pounds or kilos, which it is desired to precipitate of the iron and aluminium combined as $FeSO_4 + Al_2(SO_4)_3$ in the solution, then multiply the total pounds or kilos of iron to be precipitated by the factor 1.786 and this will give the amount of calcium carbonate required to be added to the solution to precipitate the iron desired to be precipitated. Then multiply the total aluminium (in the solution) desired to be precipitated by the factor 2.942, and this will give the amount of calcium carbonate required to precipitate all the aluminium desired.

By this first step only traces of copper are precipitated as cupric hydroxide in the residues of calcium sulphate and basic salts in the solution.

In the second step sufficient free acid is then added to the solution to dissolve the copper precipitated as cupric hydroxide. By this invention base metals are precipitated from a copper sulphate solution without precipitating copper, and a part of the combined acid in the solution is neutralized.

If it is desired to precipitate the base metals like iron and aluminium combined as sulphates in the solution and recover the acid, both free and combined, the solutions are agitated with air in the presence of finely ground copper oxide or carbonate ore, or copper hydroxide.

The effect of agitating with air a solution containing $CuSO_4+FeSO_4+Al_2(SO_4)_3$ and copper in a soluble form is that iron and aluminium are precipitated and the acid combined with these metals dissolves the copper in the form added and forms $CuSO_4$.

This process of purifying a copper sulphate solution can be varied in various ways by metallurgists skilled in the art, without departing from the scope of my invention.

Other impurities, like arsenic, antimony, bismuth, and so forth, are also precipitated from copper sulphate solutions as well as iron and aluminium, by this process, without precipitating copper.

When the leaching solutions are purified as above described in agitators I, the solutions and the precipitated hydrates of the base metals and calcium sulphate in the residues pass into the filter press K through the line W.

The clear solutions from the filter press K flow through line V into the storage tank L. The filter cake is washed, the wash water going into the solutions in tank L through line V, the tailings being discharged through line $K^1$. The solutions then flow into the standardizing tank P through line $V^1$. The standardizing tank P represents the electrolytic circulating system which in a plant is preferably placed in the basement of the electrolytic building under the electrolytic cells.

Free acid is added to the solutions in tank P through line U $U^1$, to standardize the electrolyte before the solutions are electrolyzed. These solutions in tank P are also heated to a temperature of about 45° C before electrolyzing by steam coils (not shown) placed in tank P, steam being supplied through line Q.

The standardized electrolyte then passes from tank P, through the line $V^2$ to the electrolytic cells in the electrolytic building M. These solutions, when passing into the electrolytic cells should carry about 2% copper, 1.5% free acid, and have a temperature of about 45° C. These conditions are varied in accordance with the current density used in electrolysis.

The electrolytic cells are formed with a series of lead anodes and copper cathodes, and the electrolyte is circulated between the electrodes (and preferably at right angles to the flow of the electric current) by means of pumps, the solution passing through the cells in a continuous flow. Part of the copper only is deposited as electrolytic copper and its equivalent of sulphuric acid is formed in the electrolyte, and part of the copper is continuously carried in solution so as always to maintain an electrolyte of high efficiency.

After the solutions are electrolyzed by passing through a series of electrolytic cells in building M, they pass out through line U. The solutions then contain $$CuSO_4+H_2SO_4+H_2O.$$

Part of the solution is used to standardize with acid the electrolyte in tank P through line U $U^1$, and part goes through line U $U^2$, to the storage tank N to be used in leaching the ore.

From the storage tank N the acid solution can be used directly to leach the ore in tanks F through line C or to standardize the acid solutions in tank H through line C $C^1$ and the acid solutions from this tank H can also be used to leach the ore in tanks F through lines $C^2$ and C.

After the copper is extracted from the ore by leaching, the solutions in tanks F are replaced by water in the following manner:—

When the ore is leached and the solution is draw down until it begins to disappear below the top of the ore, the solution outlets at the bottom of the leaching tanks F are closed, and the fresh water is added to the top of the ore until the volume of the water added is equal to the volume of the solution in the ore. The solution outlets at the bottom of the leaching tanks F are then opened and the solutions allowed to run. By this method the volume of water on top of the solutions and ore replaces the solutions in the ore with water.

The ore residues in the leaching tanks F (which in treating pyritic ores are valuable as iron ore, and other ores) and residues of waste material are discharged through the bottom openings in the tanks and pass out on the conveyor line R.

Referring now to Fig. 2:

The ore enters the furnace through an opening in the arch over the first hearth and is spread over the hearths and moved from hearth to hearth through the openings $n$ $n$ $n$ by the rabble arms $m$ in the ordinary way.

Air is supplied to the furnace by the fan $d$ and passes up through the central air shaft $c$ passing through the rabble arms $m$, and is heated and passes out at the top of the air shaft $c$ in the ordinary manner.

A damper $g$ is placed in the air shaft $c$. Below this damper there are two air pipes $b$, $b$, connected to the air shaft $c$, so that by closing the damper $g$ the hot air is conducted down to the 7th hearth of the furnace.

The object of this feature of my invention is to add extra heat and oxygen to the 4th, 5th and 6th hearths of the furnace. The amount of air required is regulated by the damper $g$. At the 4th hearth I connect pipe $a$ which joins at the top with the main gas flue $l$ of the furnace. The object of this pipe is to by-pass a part of the hot air and gases formed in the lower part of the furnace so that the portion of said gases thus deflected through the pipe *a* does not pass through the 1st, 2nd and 3rd hearths, but goes directly into the main gas flue *l* to prevent a high percentage of $SO_2$ gas forming in the 1st, 2nd and 3rd hearths, and also to prevent the hot gases formed in the lower part of the furnace from over-heating the ore in the 1st, 2nd and 3rd hearths.

In the main gas flue *l* near the 1st hearth I have placed the damper *h*, and in the by-pass pipe *a* the damper *i*. By opening or closing these dampers the hot gases are controlled as desired either through by-pass pipe *a*, or through the openings *n n n* in the 1st, 2nd and 3rd hearths and main gas flue *l*, thus controlling the temperature and concentration of the $SO_2$ gas in the 1st, 2nd and 3rd hearths.

This method of furnace control, in roasting ores produces an oxidizing atmosphere in the whole furnace with a controlled temperature which forms oxides and sulphates of metals from the metal sulphides in the ore.

I do not confine myself to using the hot air from the air cooling system of the standard air-cooled furnace. The hot air or heat in any form can be produced from any source, such as an air heating system outside of the furnace proper, or by direct firing.

For registering the temperature on each hearth thermo-electric pyrometers are placed in the ore at *f f f f f f* and conducted to a switch board and temperature indicator at *e*.

In the by-pass pipe *a* there is placed a dust clean-out door *k*.

My invention comprises an electro-chemical process for the extraction of copper from all classes of copper ores, concentrates or residues roasted or not, in accordance with their character. If roasted, the roasting is controlled, advantageously, as described with reference to Fig. 2, so that the copper in the ore will combine with the sulphur and oxygen to form soluble compounds, making the excess sulphur (if any) in the ore available for the manufacture of sulphuric acid, and the iron in pyritic ores available as iron ore. The copper in the ore is leached out with a solution or solutions of sulphuric acid produced in the process. The impurities in the leaching solutions are precipitated, and the acid radicles regulated in the solutions before they are used as an electrolyte, so as to produce the refined electrolytic copper of commerce directly from the leaching solutions in a continuous operation.

What I claim is:—

1. A complete process for directly producing electrolytic copper from copper sulphide ores, concentrates, or residues of such ores, comprising roasting the ores, concentrates or residues to render the copper soluble; leaching the roasted product with a solution of sulphuric acid to extract the copper; purifying this copper sulphate solution of undesired constituents, such as iron and aluminium and the like; regulating and controlling the acid and bases in the solution, substantially as described; and then electrolyzing such purified and regulated solution to deposit metallic copper and to regenerate sulphuric acid.

2. A complete process for directly producing electrolytic copper from copper sulphide ores, concentrates or residues of such ores, which consists in roasting the ores, concentrates or residues to render the copper soluble; leaching the roasted product with a solution of sulphuric acid thereby extracting the copper in a solution which also contains undesired metals such as iron and aluminium; purifying this solution by precipitating the undesired metals and but slight amounts of copper; taking such precipitated copper again into solution as by the addition of free sulphuric acid; and then electrolyzing this purified solution to produce electrolytic copper and to regenerate sulphuric acid.

3. A complete process for directly producing electrolytic copper from copper sulphide ores, concentrates or residues of such ores, comprising roasting the ores, concentrates or residues to render the copper soluble; leaching the roasted product with a solution of sulphuric acid to extract the copper; purifying this copper sulphate solution of undesired constituents such as iron and aluminium, by adding to said solution in the presence of an oxidizing agent, calcium carbonate in calculated quantity preferably slightly less than the total chemical equivalent of the undesired constituents so as to precipitate sufficient of the latter for subsequent efficient electrolysis of the thus purified solution without appreciable precipitation of copper; and where any copper is precipitated and worth while to recover, taking such precipitated copper again into the solution by treating the precipitate with free sulphuric acid, regulating and controlling the acid and bases in the solution, and then electrolyzing this purified and regulated solution to deposit metallic copper and to regenerate sulphuric acid.

4. A complete electro-chemical process for producing refined electrolytic copper from sulphide ores, concentrates or residues, comprising roasting said ores, concentrates or residues and controlling the roast to render the greatest possible proportion of the copper soluble without regard to the proportion of undesirable constituents, such as iron and aluminium, also rendered soluble and to regulate the proportion of sulphates of the metals formed; leaching the roasted product with sulphuric acid; and purifying and regulating the resulting solution in such a manner that the impurities such as iron and aluminium are taken into solution with the copper are precipitated to the desired extent and the composition of the solution is maintained substantially uniform; and then electrolyzing this purified and regulated solution to deposit metallic copper and to regenerate sulphuric acid.

5. A complete process for directly producing electrolytic copper from copper sulphide ores, concentrates or residues of such ores, comprising roasting the ores, concentrates or residues to render the copper soluble; leaching the roasted product with a solution of sulphuric acid to extract the copper; purifying this copper sulphate solution of iron and aluminium by adding to said solution in the presence of an oxidizing agent a quantity of calcium carbonate equal to the amount by weight of iron which it is desired to precipitate from the solution multiplied by the factor 1.786 plus the amount by weight of aluminium multiplied by the factor 2.942; regulating the acid in the solution; and then electrolyzing this purified and regulated solution to deposit metallic copper and to regenerate sulphuric acid.

6. A complete process for directly producing electrolytic copper from copper sulphide ores, concentrates or residues of said ores, comprising roasting such ores, concentrates or residues in multiple stages; supplying hot air to the zone of the later stages of the roast and removing part of the gases formed in the later stages of the roast before they reach the zone of the earlier stages of the roast; leaching the roasted product with a solution of sulphuric acid to extract the copper in solution; purifying this copper sulphate solution of undesired constiuents such as iron and aluminium; and electrolyzing the purified solution to deposit metallic copper and to regenerate sulphuric acid.

7. A complete process for directly producing electrolytic copper from copper sulphide ores, concentrates or residues, comprising roasting the ores, concentrates or residues in several stages each of which is controlled as to temperature and as to the disposal of sulphur dioxide gas; leaching the roasted product with a solution of sulphuric acid to extract the copper; purifying the resulting copper sulphate solution of undesired constituents such as iron and aluminium; regulating the free acid in the solution; and electrolyzing such purified and regulated solution to deposit metallic copper and to regenerate sulphuric acid.

8. A complete process for directly producing electrolytic copper from copper sulphide ores, concentrates or residues of ores, comprising roasting the ores, concentrates or residues to render the copper soluble; successively leaching the roasted product with two solutions of sulphuric acid of different concentrations, the weaker acid solution being first applied to the ore until said solution becomes enriched with the metals forming a neutral or nearly neutral solution of relatively high specific gravity, the stronger acid solution of lower specific gravity being subsequently applied to the ore to extract the remaining soluble metal and form a weaker acid solution available for the primary leaching of a fresh charge of ore; withdrawing the aforesaid neutral or nearly neutral solution of relatively high specific gravity; and purifying said solution of undesired constituents such as iron and aluminium; regulating the free acid strength of said solution to form a standardized electrolyte; and electrolyzing the said solution to deposit metallic copper and regenerate sulphuric acid.

9. A complete electro-chemical process for directly producing electrolytic copper from copper sulphide ores, concentrates, or residues of ores, comprising roasting the ores, concentrates or residues in several stages; supplying hot air to the zone of the later stages of the roast and removing part of the gases formed in the later stages before they reach the zone of the earlier stages of the roast; leaching the roasted product with two solutions of sulphuric acid of different concentrations, the weaker acid solution being first applied to the ore until said solution becomes enriched with the metals forming a neutral or nearly neutral solution of relatively high specific gravity, the stronger acid solution of lower specific gravity being subsequently applied to the ore to extract the remaining soluble metal and form a weaker acid solution available for the primary leaching of a fresh charge of ore; withdrawing the aforesaid neutral or nearly neutral solution of relatively high specific gravity; purifying said solution of iron and aluminium by treating the solution in the presence of an oxidizing agent with calcium carbonate in calculated quantity slightly less than the total chemical equivalent of the iron and aluminium to precipitate sufficient of the latter for subsequent efficient electrolysis without appreciable precipitation of copper; regulating the free acid strength of the solution to form a standard electrolyte; and electrolyzing the purified and regulated solution to deposit metallic copper and to regenerate sulphuric acid.

HENRY SQUAREBRIGS MacKAY.